(12) United States Patent
Radelinow

(10) Patent No.: US 6,977,534 B2
(45) Date of Patent: Dec. 20, 2005

(54) LOW VOLTAGE DIFFERENTIAL SIGNALING [LVDS] DRIVER WITH PRE-EMPHASIS

(75) Inventor: Andrzej Gajdardziew Radelinow, Deurne (BE)

(73) Assignee: Alcatel, Paris (FR)

(*) Notice: Subject to any disclaimer, the term of this patent is extended or adjusted under 35 U.S.C. 154(b) by 47 days.

(21) Appl. No.: 10/736,551

(22) Filed: Dec. 17, 2003

(65) Prior Publication Data

US 2004/0124888 A1 Jul. 1, 2004

(30) Foreign Application Priority Data

Dec. 23, 2002 (EP) .................... 02293229

(51) Int. Cl.[7] ............................. H03B 1/00
(52) U.S. Cl. .................... 327/112; 327/108; 326/83
(58) Field of Search ................ 327/108–112, 379, 327/389, 391, 333, 65, 66, 67; 326/80, 81, 326/83, 86, 87, 26, 27; 330/258

(56) References Cited

U.S. PATENT DOCUMENTS

| | | | |
|---|---|---|---|
| 5,444,446 A | 8/1995 | Gopinathan et al. | 347/135 |
| 6,281,715 B1 | 8/2001 | DeClue et al. | 327/165 |
| 6,288,581 B1 | 9/2001 | Wong | 327/108 |
| 6,590,432 B1 * | 7/2003 | Wu et al. | 327/108 |
| 6,590,436 B2 * | 7/2003 | Jordanger et al. | 327/333 |
| 2002/0084870 A1 | 7/2002 | Cranford | 333/165 |
| 2004/0124891 A1 * | 7/2004 | De Laurentiis et al. | 327/112 |

* cited by examiner

*Primary Examiner*—Long Nguyen
(74) *Attorney, Agent, or Firm*—Sughrue Mion, PLLC

(57) ABSTRACT

A Low Voltage Differential Signaling Driver with Pre-emphasis and including a primary stage having a first switching circuit providing an output representing a sequence of pulses at a predetermined current level, a secondary stage having a second switching circuit arranged to provide an additional current level for the pulses, and a control circuit arranged to provide control signals for controlling the first and second switching circuits. The control circuit detects a difference in level between two consecutive pulses of the sequence and provides accordingly control signals to the first and second switching circuits. The control signals are such that when two consecutive pulses of the sequence are different, the additional current level is added to the predetermined current level, whilst when two consecutive pulses of the sequence are identical, the additional current level is subtracted from the predetermined current level.

7 Claims, 5 Drawing Sheets

LVDS output stage with pre-emphasis and common-mode bias

Differential shift register with standard flip-flops

LVDS output stage with pre-emphasis and common-mode bias

LVDS driver with programmable pre-emphasis

LOW VOLTAGE DIFFERENTIAL SIGNALING [LVDS] DRIVER WITH PRE-EMPHASIS

FIELD OF THE INVENTION

The present invention is related to the transmission of high-speed serial binary data over a copper line, according to the Low Voltage Differential Signaling [LVDS] method.

STATE OF THE ART

Low Voltage Differential Signaling [LVDS] is a method for high-speed serial transmission of binary data over a copper transmission line. It is widely adopted in telecom equipment because of its immunity to crosstalk noise, low electromagnetic interference and low power dissipation. The increasing number of backplane interconnections in multi-Gb/s telecom systems significantly increases the crosstalk noise and the channel intersymbol interference. The main cause of inter-symbol interference in the high-speed serial links is the attenuation and the dispersal of frequency components resulting from the signal propagation down a transmission line. Data pulses respond to these effects with a loss of amplitude and displacement in time, known as deterministic jitter.

In order to increase the switching speed a pre-emphasis circuit is applied. The pre-emphasis filter controls the LVDS driver output power in such a way that when a bit transition is occurring, the transmitted power corresponds to the maximum level and when there are no bit transitions, the power is decreased. This waveform shaping is realized by a digital filter. This results in an equalized amplitude of all sent bits at the termination point and reduced data-dependent jitter.

The prior art US2002/0084870 is close in principle but relates to a non-LVDS compliant buffer type. In this invention a push-pull output structure is proposed.

In prior art U.S. Pat. No. 6,288,581 the LVDS output buffer has two parallel stages. A first (primary) stage comprises two current sources and four switches to generate the pulses (bits) to be transmitted on the line, and a second stage comprises two current sources and four switches to provide an additional (lower) current only when the signal alternates fast. There are two link transistors representing additional unwanted resistance. The voltage drop across this resistance reduces the differential dynamic range of the driver in case of a low-voltage CMOS process. Another important disadvantage of this prior art is the fact that the link between the two stages is built with a single NMOS device per output, which causes the link devices to be switched off when the voltage on their source terminals is higher than the difference between the supply voltage and the threshold voltage of the link devices. This leads to common-mode glitches at the output if the driver is used in an embodiment requiring a low supply voltage.

Prior art U.S. Pat. No. 6,281,715 makes use of switched tail current sources realized in PMOS and NMOS devices setting the LVDS output current. Because the pre-emphasis current control is accomplished by switching the PMOS and NMOS transistor switches interrupting the currents of the PMOS and NMOS current sources, common-mode glitches appear in the output signal. This is due to the non-synchronous control of the NMOS and PMOS switches caused by additional inverter propagation delay and a higher gate capacitance of the PMOS switch, as well as due to the high output common-mode impedance of the driver. Another disadvantage is that the delay of the inverters is dependent on process variations and produces a very narrow pre-emphasis pulse with a reasonable number of inverters used. This short pre-emphasis pulse contains very high frequency components, being attenuated by the transmission line. As a result, the pre-emphasis pulse is not efficiently improving the eye pattern at the termination point. The waveform shaping is not well reproducible due to the spread of process parameters, supply voltage and temperature variations.

Another disadvantage in prior art U.S. Pat. No. 6,281,715 is the fact that only NMOS devices are used in the output structure of the driver, leading to an asymmetrical transfer characteristic of the output stage leading to an asymmetrical positive-to-negative waveform shape. This also reduces the dynamic range of the stage in low-voltage CMOS process. Another issue of this output structure is the impossibility to use dedicated I/O transistors with embedded ESD protection.

Still another important disadvantage of prior art U.S. Pat. No. 6,281,715 is the fact that the single-ended to differential conversion of the logic (digital) signal required for driving differential output stage is realized with a simple inverter. The delay introduced by the inverter generates common-mode glitches at the gates of the output transistors. This common-mode component is amplified at the driver output. This component is unwanted as it increases the board noise and the jitter generation of the receiving device.

Yet another disadvantage of prior art U.S. Pat. No. 6,281,715 and U.S. Pat. No. 6,288,581 is the absence of a common-mode bias circuit. For U.S. Pat. No. 6,288,581 this is leading to an output common-mode being undefined. For U.S. Pat. No. 6,281,715 this leads to output common-mode voltage offset under different pre-emphasis levels and resistor process variation. This common-mode offset makes a direct DC connection between the driver and the receiving LVDS device difficult, because the receiver input common-mode voltage is forced to a non-optimal value.

AIMS OF THE INVENTION

The present invention aims to provide an improved Low Voltage Differential Signaling [LVDS] driver with a pre-emphasis circuit, solving the problems of the state of the art.

SUMMARY OF THE INVENTION

The present invention is related to a Low Voltage Differential Signaling [LVDS] Driver comprising:
- a primary stage having first switching means arranged to provide a sequence of pulses at a predetermined current level,
- a secondary stage having second switching means arranged to provide an additional current level for said pulses, and
- a control circuit arranged to provide control signals for controlling said first and second switching means.

Said control circuit is arranged to detect a difference in level between two consecutive pulses of said sequence and to provide accordingly control signals to the first and second switching means in such a way that:
- when said consecutive pulses of said sequence are different, said additional current level is added to said predetermined current level; whilst
- when said consecutive pulses of said sequence are identical, said additional current level is subtracted from said predetermined current level.

According to a preferred embodiment of the invention, said primary stage also comprises a first and a second current source and a first and a second current sink. Said secondary stage also comprises a current source and a current sink.

In another embodiment of the LVDS Driver, further comprising a current control circuit, said second current source and said second current sink of said primary stage are substantially identical to said current source and said current sink of said secondary stage. Said second current source and said second current sink of said primary stage and said current source and said current sink of said secondary stage are controlled by said current control circuit.

In an advantageous embodiment of present invention said control circuit comprises four standard flip-flop cells.

In a specific embodiment said LVDS driver further comprises N current control circuits, with N>2, adapted to be combined in order to control said first and second current source and said first and second current sink of said primary stage.

Advantageously, the Low Voltage Differential Signaling Driver according to the invention, further comprises a common-mode bias circuit with a first resistive pair, a second resistive pair and an Operational Transconductance Amplifier.

SHORT DESCRIPTION OF THE DRAWINGS

DETAILED DESCRIPTION OF THE INVENTION

Figure 1:
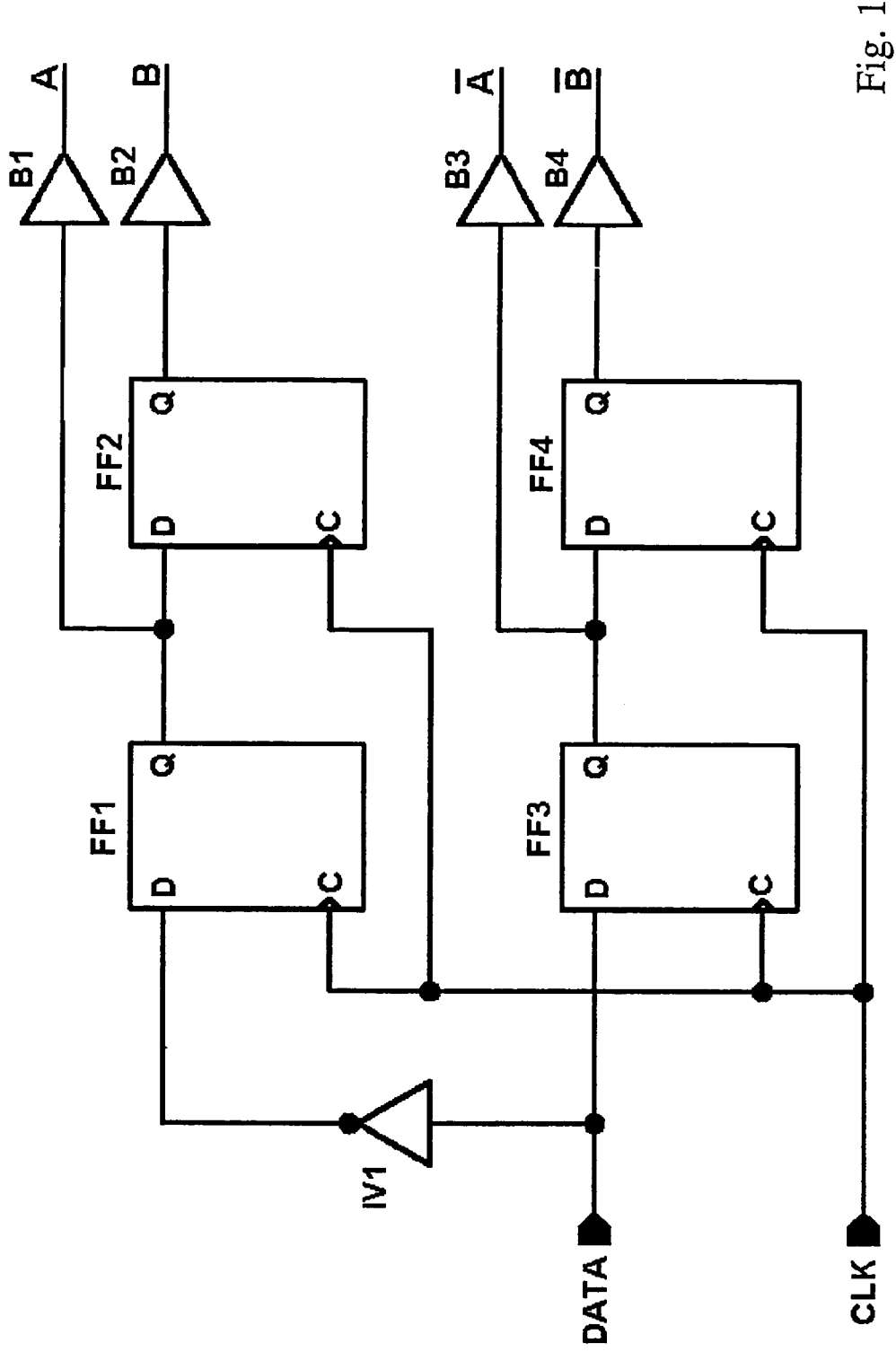
FIG. 1 represents a differential shift register with standard flip-flops.
Figure 4:
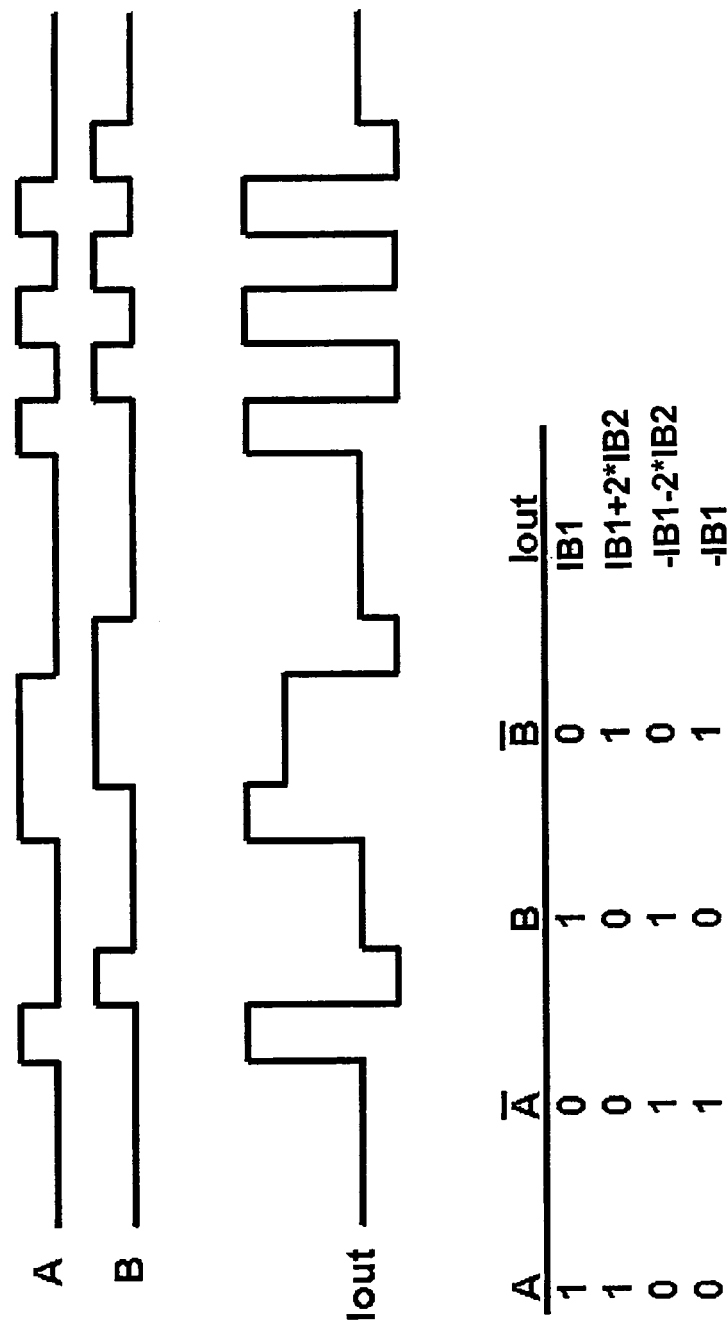
FIG. 4 represents a timing diagram and truth table.

A differential shift register with standard flip-flops like in FIG. 1 stores the currently sent bit and the previously sent bit. The shift register outputs drive via buffers B1, B2, B3, B4 two complementary NMOS-PMOS differential output LVDS stages (shown in FIG. 2): a Primary stage (MN5, MN6, MP5, MP6) and a Secondary stage (MN8, MN9, MP8, MP9). In a particular embodiment the transistors MN1, MN3 have equal width W and length L and MP1, MP3 have equal W and L. Transistors MN2, MN4, MN7 have equal W and L. MP2, MP4, MP7 as well have equal W and L. Thus the Primary stage and the Secondary stage generate output currents I1=IB1+IB2 and I2=IB2, respectively. In the real circuit the bias transistor MN1, MN2, MP1, MP2 widths W are downscaled, as well as currents IB1 and IB2. The parallel cross-connection of both output stages causes the total output current IOUT of the driver to be either the sum or the difference of the output currents of the Primary and Secondary stages, depending on the data pattern being sent to the driver (FIG. 4). As a result, when a current bit is equal to the previous bit, the difference of the currents I1−I2 is provided to the line, whilst when the currently sent bit is different to the previous bit, the sum of currents I1+I2 is provided. This is used for two-level output waveform shaping. This approach has a beneficial effect on the eye diagram of the circuit.

Figure 2:
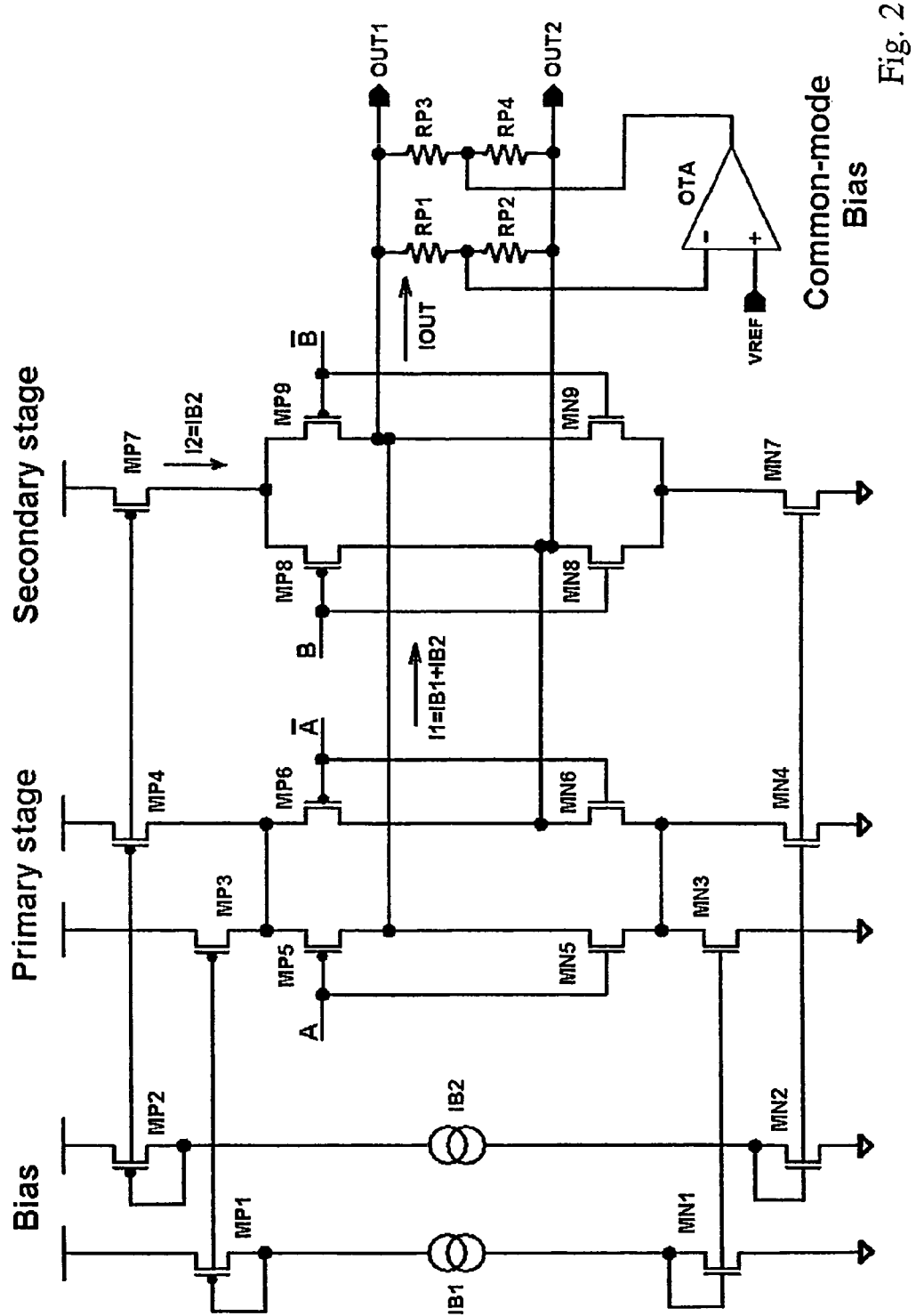
FIG. 2 represents a LVDS output stage with pre-emphasis and common-mode bias, according to the invention.

Another specific feature of the invention is the fact that the same additional current I2 generated in the Secondary stage is also added to the Primary stage bias current. This is realized by the replica (mirrored) current sources MN4, MP4, where MN4 has an equal W and L to MN7 and MP4 has an equal W and L to MP7 (FIG. 2). In this way, the second output current level, I1−I2, (occurring in case of a sequence of identical bits) is always fixed because the current of the Secondary stage is cancelled by the replica current in the primary stage: I1−I2=IB1+IB2−IB2 =IB1. This allows programmability of the pre-emphasis first level (peak output power) by pre-setting the current IB2 while the second level remains fixed.

Figure 3:
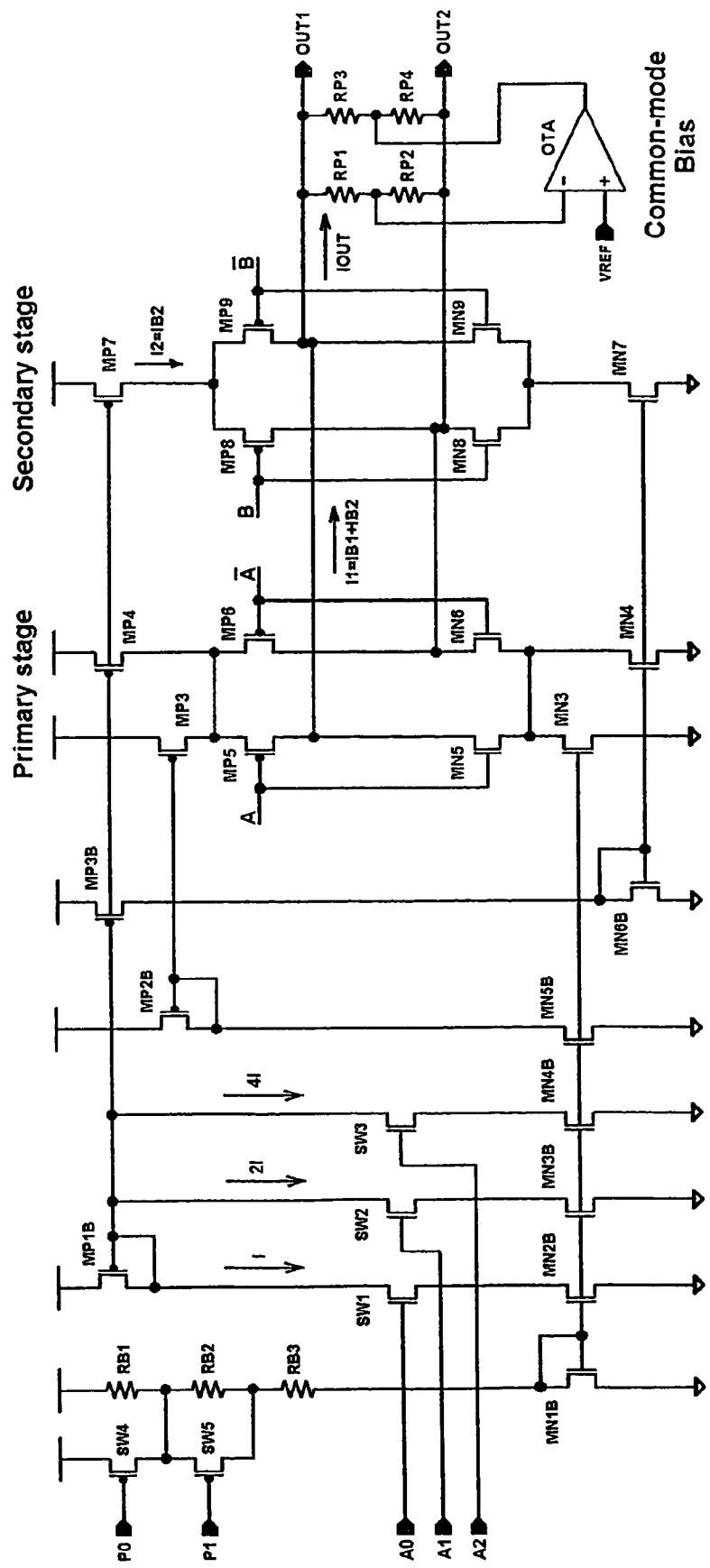
FIG. 3 represents a LVDS driver with programmable pre-emphasis.

A programmable pre-emphasis LVDS driver is presented on FIG. 3. The programmability of the pre-emphasis current is realized by 3 binary weighed current sources MN2B, MN3B, MN4B switched by transistors SW1, SW2, SW3, allowing $2^3=8$ preset values for the pre-emphasis peak current IB2. This current is equivalent to the current IB2 in the circuit in FIG. 2. The driver total current can be programmed by the switches SW4 and SW5: control signals P0 and P1 define 4 binary weighed presets of the driver bias current.

The differential shift register in FIG. 1 includes two single-ended shift registers with common clock signal, one shift register having the data inverted on its input by inverter IV1. In this way the complementary (differential) output signals from the register are not displaced in time due to the extra inverter delay, as would be the case in prior art U.S. Pat. No. 6,281,715. This is due to the fact that the single-ended to differential conversion is done in the digital domain with positive edge-triggered flip-flops. The shift registers are realized by four standard flip-flop cells FF1, FF2, FF3, FF4.

A common-mode bias circuit is biasing the output common-mode voltage of the driver at a voltage equal to a reference voltage VREF, usually equal to half the supply voltage. The common-mode loop is realized by two resistive pairs constituted by series connected resistors RP1, RP2 and RP3, RP4 respectively, and an Operational Transconductance Amplifier OTA. The first resistive pair RP1, RP2 is used for sensing the driver output common-mode voltage Vcm=(Vout1+Vout2)/2, whilst the second resistive pair RP3, RP4 is used to force the driver output common-mode voltage to the reference voltage VREF by injecting common-mode current in the differential line, generated by OTA and split by the resistors RP3 and RP4.

In more detail, the first and second resistive pairs are connected in parallel between output terminals OUT1 and OUT2 of the LVDS driver. The junction point between RP1 and RP2 is connected to inverting input of the amplifier OTA, of which the output is connected to the junction point of the RP3 and RP4, the reference voltage VREF being applied to the non-inverting (+) of OTA. The OTA output current capability is designed to compensate the current mismatch between the PMOS and NMOS current sources in the LVDS driver.

Figure 5:
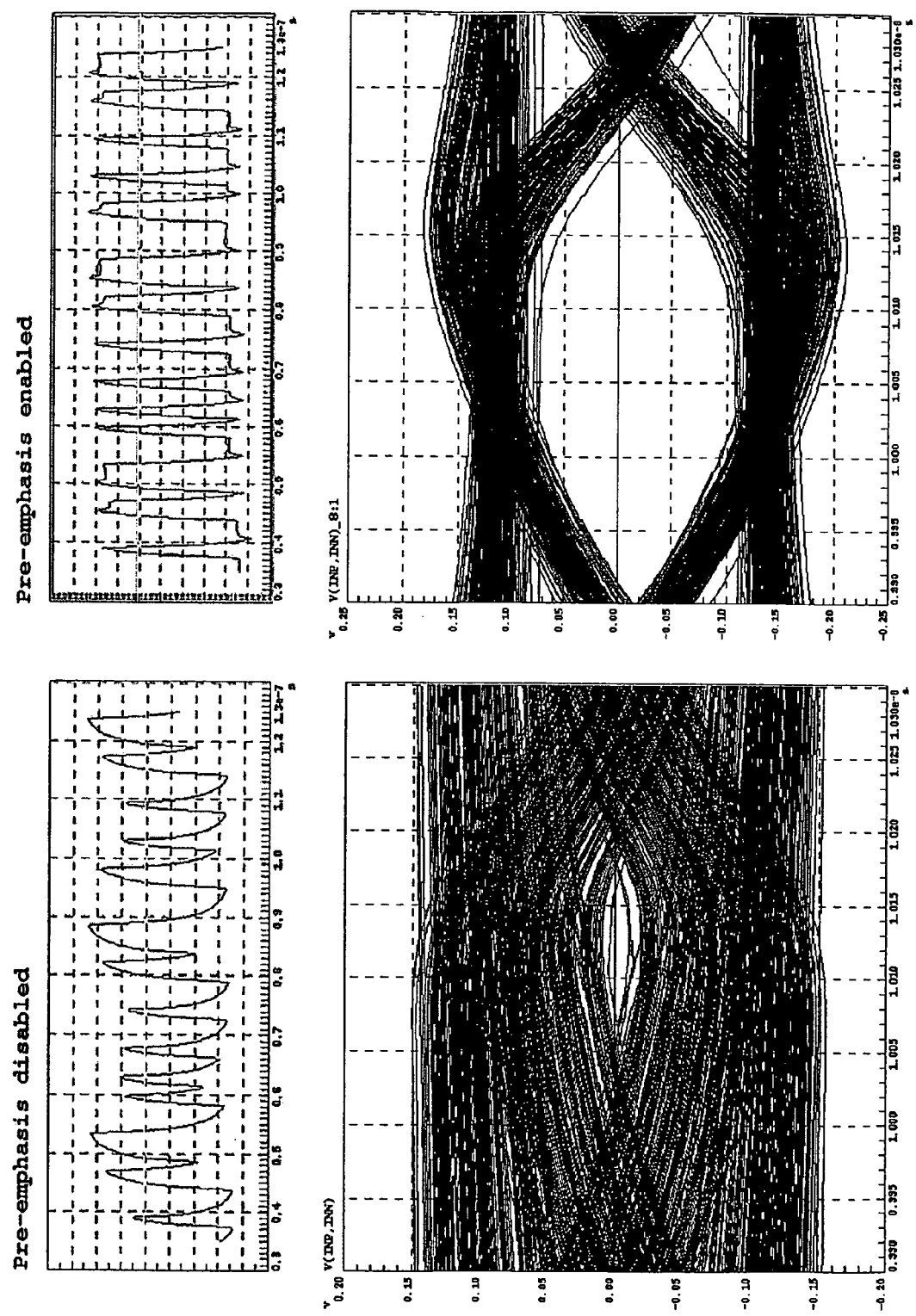
FIG. 5 represents the achieved reduction of data dependent jitter at the termination point, seen as improvement of the eye diagram.

The eye diagram at the termination point is significantly improved when the invented circuit is enabled, as illustrated in FIG. 5. If the pre-emphasis feature is disabled, then:

The amplitude of alternating data bits is reduced

The eye diagram at the input of the receiving device is significantly closed in terms of minimal signal amplitude and timing, leading to the impossibility to perform data recovery or synchronization.

If the pre-emphasis feature is enabled, then:
  The amplitude of all data bits is equal
  The eye diagram at the input of the receiving device (line termination) is significantly wider, showing the achieved reduction of data dependent jitter.

The present invention offers several advantages over the prior art solutions: LVDS compliance, low complexity, lower common-mode board noise and an accurately predistorted output signal resulting in a widely open eye pattern at the receiver input.

What is claimed is:

1. A Low Voltage Differential Signaling [LVDS] Driver for providing a driver output representing a sequence of data bits, said driver comprising:
   a primary stage having first switching component arranged to provide a first output current in response to first control signals,
   a secondary stage having second switching component arranged to provide a second output current in response to second control signals,
   a control circuit arranged to provide said first and second control signals for controlling said first and second switching components,
   characterized in that said control circuit is arranged to detect a difference in level between two consecutive bits of said sequence and to provide said first and second control signals in such a way that:
   when said two consecutive bits of said sequence are different, said first and second output currents are added to generate said driver output; whilst
   when said two consecutive bits of said sequence are identical, said second current is subtracted from said first current to generate said driver output.

2. The Low Voltage Differential Signaling Driver according to claim 1, wherein
   said primary stage also comprises a first current source and a second current source and a first current sink and a second current sink, and
   said secondary stage also comprises a current source and a current sink.

3. The Low Voltage Differential Signaling Driver according to claim 2, wherein
   said Driver further comprises at least one current control circuit,
   said second current source and said second current sink of said primary stage are substantially identical to said current source and said current sink of said secondary stage, and
   said second current source and said second current sink of said primary stage and said current source and said current sink of said secondary stage are controlled by said current control circuit.

4. The Low Voltage Differential Signaling Driver according to claim 3, wherein said Driver comprises N current control circuits with N>2, adapted to be combined in order to control said first and second current sources and said first and second current sinks of said primary stage.

5. The Low Voltage Differential Signaling Driver according to claim 1, wherein said control circuit comprises four standard flip-flop cells.

6. The Low Voltage Differential Signaling Driver according to claim 1, wherein said Driver further comprises a common-mode bias circuit including a first resistor pair, a second resistor pair and an Operational Transconductance Amplifier.

7. The Low Voltage Differential Signaling Driver according to claim 6, wherein
   said first resistor pair is coupled to a first input of said Operational Transconductance Amplifier,
   said Amplifier is coupled to said second resistor pair, and
   a reference voltage is applied to a second input of said Amplifier.

* * * * *